US010055323B2

(12) United States Patent
Moore et al.

(10) Patent No.: US 10,055,323 B2
(45) Date of Patent: Aug. 21, 2018

(54) SYSTEM AND METHOD FOR MONITORING BUILDING ENVIRONMENTAL DATA

(71) Applicant: BRAEBURN SYSTEMS LLC, Montgomery, IL (US)

(72) Inventors: Glenn A Moore, Geneva, IL (US); Daniel S. Poplawski, Oswego, IL (US)

(73) Assignee: Braeburn Systems LLC, Montgomery, IL (US)

(*) Notice: Subject to any disclaimer, the term of this patent is extended or adjusted under 35 U.S.C. 154(b) by 389 days.

(21) Appl. No.: 14/928,519

(22) Filed: Oct. 30, 2015

(65) Prior Publication Data

US 2016/0124828 A1 May 5, 2016

Related U.S. Application Data

(60) Provisional application No. 62/072,819, filed on Oct. 30, 2014.

(51) Int. Cl.
*G06F 11/30* (2006.01)
*H04L 29/08* (2006.01)
(Continued)

(52) U.S. Cl.
CPC .......... *G06F 11/3068* (2013.01); *H04L 67/12* (2013.01); *H04W 4/20* (2013.01)

(58) Field of Classification Search
CPC ................................................. G06F 11/3068
See application file for complete search history.

(56) References Cited

U.S. PATENT DOCUMENTS

| 2,054,039 | A | 9/1936 | Persons |
| 2,060,636 | A | 11/1936 | Persons |

(Continued)

FOREIGN PATENT DOCUMENTS

| JP | 58065977 | 4/1983 |
| JP | 2004218436 | 8/2004 |
| JP | 2006009596 | 1/2006 |

OTHER PUBLICATIONS

ComfortLink II XL950 Control, User Guide, Trane U.S. Inc., 2011.
(Continued)

*Primary Examiner* — Phuong Huynh
(74) *Attorney, Agent, or Firm* — Law Offices of Konrad Sherinian

(57) ABSTRACT

The invention provides a system for generating a performance data (PD) report comprising a first module for collecting performance data, a second module for formatting the PD and selecting from at least one of the following types of data: system run time in minutes, heat run time in minutes, cooling run time in minutes, fan run time in minutes, average heating temperature by degrees, average cooling temperature by degrees, average outdoor temperature by degrees, average humidity level by percent humidity, highest indoor temperature by degrees, lowest indoor temperature by degrees, highest outdoor temperature by degrees, lowest indoor temperature by degrees, highest humidity level by percent humidity and lowest percent humidity by percent humidity, date, time, system mode, such as cool or heat or a fan, system state, room temperature, setpoint, fan state, outdoor temperature and humidity level (collectively hereinafter "custom Performance Data").

6 Claims, 5 Drawing Sheets

(51) Int. Cl.
*H04W 4/20* (2018.01)
*G21C 17/00* (2006.01)

(56) References Cited

U.S. PATENT DOCUMENTS

| | | |
|---|---|---|
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Burns |
| 5,873,519 A | 2/1999 | Beilfuss |
| 5,924,486 A * | 7/1999 | Ehlers ............... F24F 11/006 165/238 |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |

(56) References Cited

U.S. PATENT DOCUMENTS

| | | |
|---|---|---|
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,304,676 B2 | 4/2016 | Poplawski |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0245352 A1 | 12/2004 | Smith |
| 2004/0256472 A1 | 12/2004 | DeLuca |
| 2004/0260427 A1 | 12/2004 | Wimsatt |
| 2005/0033707 A1 | 2/2005 | Ehlers |
| 2005/0040248 A1 | 2/2005 | Wacker |
| 2005/0040249 A1 | 2/2005 | Wacker |
| 2005/0082836 A1 | 4/2005 | Lagerwey |
| 2005/0108620 A1 | 5/2005 | Allyn et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman, Jr. et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0318200 A1 | 12/2010 | Foslien et al. |
| 2011/0004825 A1 | 1/2011 | Wallaert |
| 2011/0031806 A1 | 2/2011 | Altonen et al. |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0032414 A1 | 2/2013 | Yilmaz |
| 2013/0056989 A1 | 5/2013 | Sabhapathy |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0152631 A1 | 6/2014 | Moore et al. |
| 2014/0163746 A1 | 6/2014 | Drew |
| 2014/0316581 A1 | 10/2014 | Fadell |
| 2014/0319233 A1 | 10/2014 | Novotny |
| 2015/0081568 A1 | 3/2015 | Land III |
| 2015/0167995 A1 | 6/2015 | Fadell |
| 2015/0233595 A1 | 8/2015 | Fadell |
| 2015/0280935 A1 | 10/2015 | Poplawski et al. |
| 2016/0062618 A1 | 3/2016 | Fagan |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |

OTHER PUBLICATIONS

Cardio lie Installer's Guide, System Version 2.5xx, 5th edition, 2008, Secant Home Automation Inc.

What you should know about flexible displays (FAQ); http://news.cnet.com/8301-1035_3-57607171-94/what-you-should-know-about-flexible-d . . . ; Nov. 25, 2013.

Brae8urn Systems LLC, "Temperature Limiting Adjustments for heating and Cooling (1000 Series)", Mportant Installation Instructions.

\* cited by examiner

Fig 8

BlueLink smart connect

| Summary for Thermostat - Main Floor | | |
|---|---|---|
| 30 Day Summary | | |
| For Period Ending 09/30/2015 12:00 AM | | |
| System Run Time | 77.5 | Hours |
| Heat Run Time | 76.5 | Hours |
| Aux Heat Run Time | 1.0 | Hours |
| Cooling Run Time | 0.0 | Hours |
| Fan Run Time | 77.5 | Hours |
| Average Heating Temperature | 68 | Degrees |
| Average Cooling Temperature | N/A | Degrees |
| Average Outdoor Temperature | 42 | Degrees |
| Average Humidity Level | 41.5 | % Humidity |
| Highest Indoor Temperature | 68 | Degrees |
| Lowest Indoor Temperature | 67 | Degrees |
| Highest Outdoor Temperature | 45 | Degrees |
| Lowest Outdoor Temperature | 30 | Degrees |
| Highest Humidity Level | 54.5 | % Humidity |
| Lowest Humidity Level | 38.0 | % Humidity |

Fig 9

BlueLink smart connect

Thermostat: Main Floor  Time Period: 30 Days, from September 1, 2015 to September 30, 2015.

| Date | Time | System Mode | System State | Room Temp | Set Point | Fan State | Outdoor Temp | Humidity Level |
|---|---|---|---|---|---|---|---|---|
| 09/30/2015 | 11:45 PM | HEAT | ON | 68.00 | 68 | ON | 41.00 | 38 |
| 09/30/2015 | 11:30 PM | HEAT | ON | 68.00 | 68 | ON | 41.00 | 38 |
| 09/30/2015 | 11:15 PM | HEAT | ON | 68.00 | 68 | ON | 41.00 | 40 |
| 09/30/2015 | 11:00 PM | HEAT | ON | 68.00 | 68 | ON | 41.00 | 41 |
| 09/30/2015 | 10:45 PM | HEAT | ON | 68.00 | 68 | ON | 41.00 | 41 |
| 09/30/2015 | 10:30 PM | HEAT | ON | 68.00 | 68 | ON | 41.00 | 41 |
| 09/30/2015 | 10:15 PM | HEAT | ON | 68.00 | 68 | ON | 41.00 | 42 |
| 09/30/2015 | 10:00 PM | HEAT | ON | 68.00 | 68 | ON | 41.00 | 42 |
| 09/30/2015 | 09:45 PM | HEAT | ON | 68.00 | 68 | ON | 41.00 | 42 |
| 09/30/2015 | 09:30 PM | HEAT | ON | 68.00 | 68 | ON | 41.00 | 41 |
| 09/30/2015 | 09:15 PM | HEAT | ON | 68.00 | 68 | ON | 41.00 | 42 |

SYSTEM AND METHOD FOR MONITORING BUILDING ENVIRONMENTAL DATA

This application claims priority to provisional application No. 62/072,819, filed Oct. 30, 2014.

The invention pertains to a method and system for monitoring building environmental data and generating data reports from a sensors and thermostats via a remote input device.

BACKGROUND

The controls for thermostats increasingly provide more programming options, as the sophistication of the thermostat functionality expands. As a result, more data points are available regarding the performance of such high-tech thermostats. Capturing and outputting such data allows users of such equipment to more carefully control the environment and plan and predict the results of potential changes in temperature and humidity. Therefore, there is desired a method and system for outputting data regarding the performance of a thermostat and interconnected heating and cooling equipment.

SUMMARY

An embodiment of the invention provides for a method for compiling building environmental data comprising the steps of providing sensors located in the building, the sensors for collecting environmental data including at least one of: indoor temperature, outdoor temperature, humidity, occupancy, smoke, $CO_2$, thermostat data including setpoints, fan on/off states, heating on/off states, cooling on/off states and room location, organizing performance data (PD) from a controller based on the environmental data received from the sensors, formatting the performance data and creating a PD report wherein the user selects at least one of summary data, detail data or all data and transmitting the PD report to a remote device.

In an embodiment the PD report is transmitted to a registered user. Wherein the report may be formatted by selecting from a 24 hour, seventy-two hour, seven day or thirty day period duration during which the performance data is collected. Wherein the PD report may be sent based on one of the following intervals: daily, weekly and monthly.

In an embodiment the method wherein the PD report may be formatted by at least one of: summary data, detail data or all data. The PD report may be used as a room source one of a basement, downstairs, family room, home office, kitchen or bedrooms. The PD report may provide for input of dealer information. The PD report may be generated directly following input of user information or user settings. The PD report may be generated at a time remote from and subsequent to the entry of the user information or user settings. The user may select from preselected data.

Another embodiment of the invention provides for a system for generating a performance data (PD) report comprising a first module for collecting performance data a second module for formatting the PD and selecting from at least one of the following formats: summary data, detail data, all data, system run time in minutes, heat run time in minutes, cooling run time in minutes, fan run time in minutes, average heating temperature by degrees, average cooling temperature by degrees, average outdoor temperature by degrees, average humidity level by percent humidity, highest indoor temperature by degrees, lowest indoor temperature by degrees, highest outdoor temperature by degrees, lowest indoor temperature by degrees, highest humidity level by percent humidity and lowest percent humidity by percent humidity, date, time, system mode, such as cool or heat or a fan, system state, room temperature, setpoint, fan state, outdoor temperature and humidity level (collectively hereinafter "custom Performance Data").

In an embodiment the system provides a custom PD report is transmitted to a registered user. The report may be formatted by selecting from a twenty-four hour, seventy-two hour, seven day or thirty day period duration during which the performance data is collected. The custom PD report may be sent based on one of the following intervals: daily, weekly and monthly. The custom PD report may have a format including: summary, detailed or all data. The report may use as a room source one of a basement, downstairs, family room, home office, kitchen or bedrooms. The custom PD report may provide for input of dealer information. The custom PD report may be generated at a time directly following the entry of the user input. The custom PD report may be generated at a time remote from and subsequent to the entry of the user input.

In another embodiment, a system for generating building environmental data is provided comprising a first module for collecting building environmental data, a second module for formatting the environmental data and transmitting the environmental data to a remote input device of a registered user. The environmental data may be selected from a twenty-four hour, seventy-two hour, seven day or thirty day period, during which the data is collected.

BRIEF DESCRIPTION OF THE DRAWINGS

For a better understanding of the subject invention reference may be had to embodiments shown in the attached drawings in which:

FIGS. 8 and 9 are illustrations of performance data reports of the present invention.

The above drawing figures depict only embodiments which are presently preferred and the invention is not limited to such disclosed embodiments or the precise arrangement and instrumentality shown.

DETAILED DESCRIPTION

Figure 1:
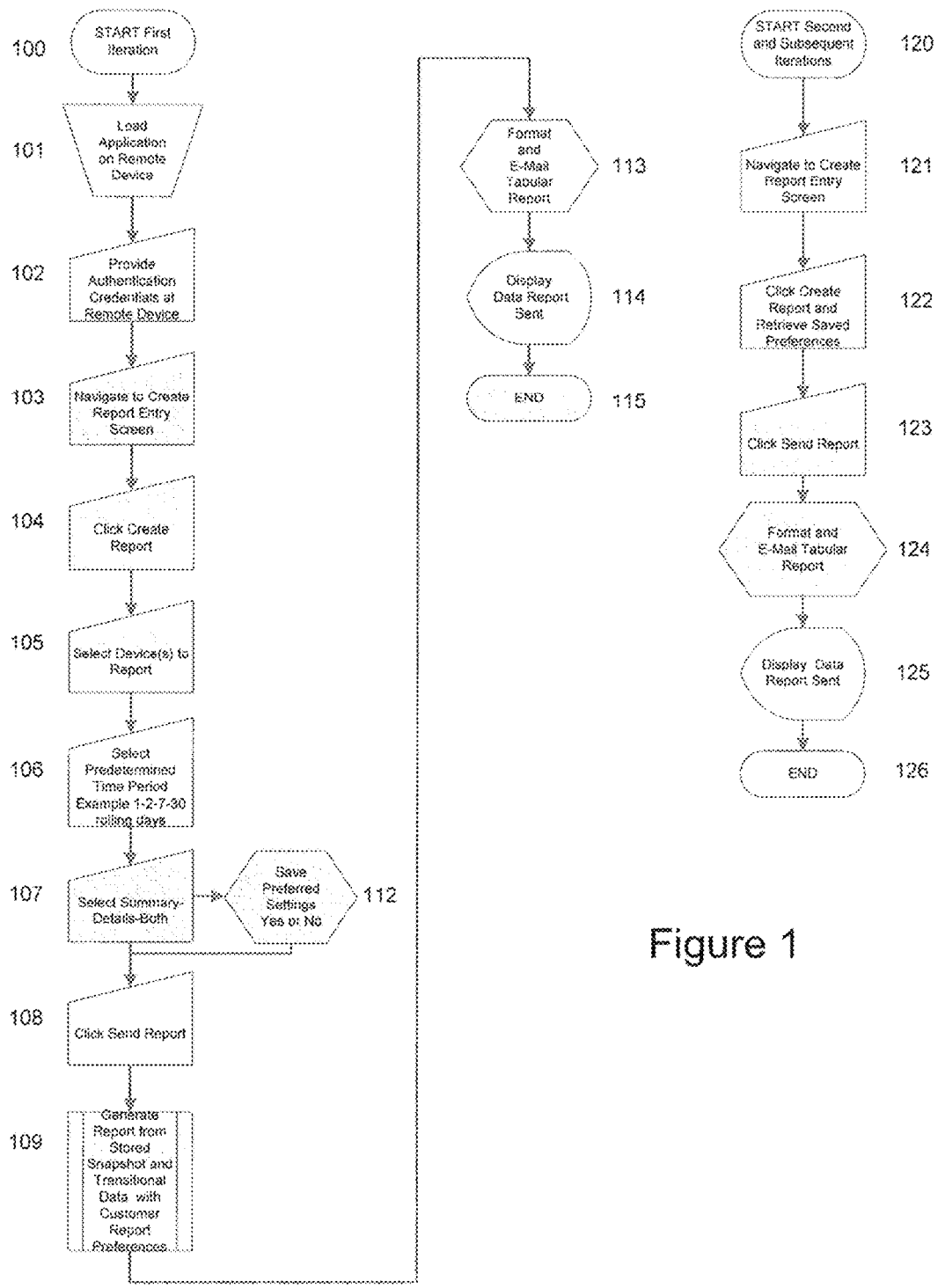
FIG. 1 is a schematic view of the steps of performing the performance data collection of the present invention.

The present invention is described with respect to FIGS. 1-9. Turning to FIG. 1, a flow diagram is provided which depicts the operation of the invention during a first operation including set up of the reporting parameters in steps 100-115; and a subsequent operation with steps 120-126.

The invention provides for output of performance data for a thermostat or other HVAC control. Data may include the following types of data: system run time in minutes, heat run time in minutes, cooling run time in minutes, fan run time in minutes, average heating temperature by degrees, average cooling temperature by degrees, average outdoor temperature by degrees, average humidity level by percent humidity, highest indoor temperature by degrees, lowest indoor temperature by degrees, highest outdoor temperature by degrees, lowest indoor temperature by degrees, highest humidity level by percent humidity and lowest percent humidity by percent humidity, date, time, system mode, such as cool or heat or a fan, system state, room temperature, setpoint, fan state, outdoor temperature and humidity level (collectively hereinafter "Performance Data"). Other data may be collected including service information to repair or update equipment such as furnaces, HVAC, fans, thermostats, sensors, wireless communications for equipment and appliances, power consumption data, power outages/surges, alarms, open/closed windows and doors, electronic utility data, water consumption, gas consumption, time of sunset/sunrise, or high winds.

Figure 2:
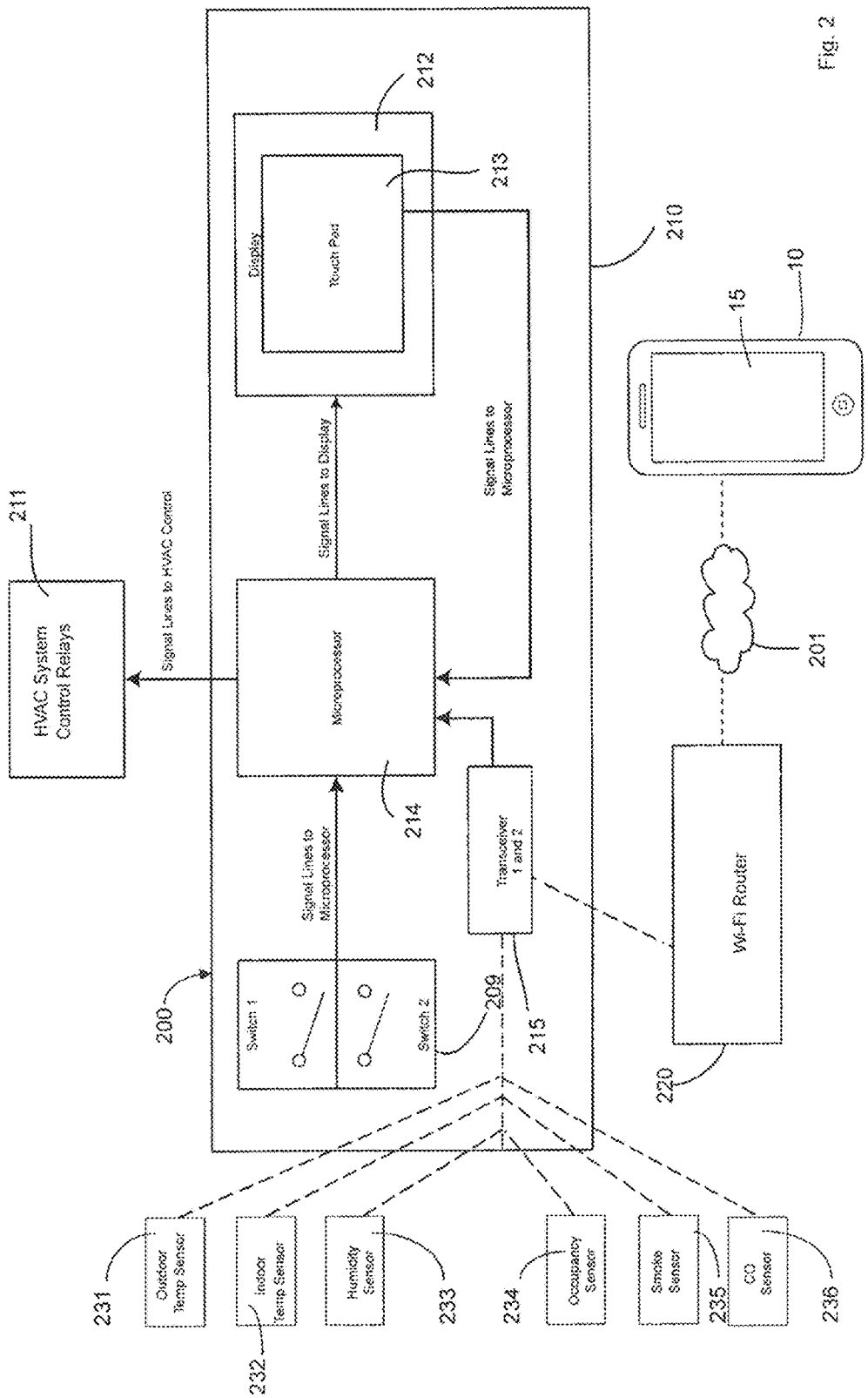
FIG. 2 is a schematic view of a thermostat in a building including remote input devices and sensors.
Figure 3:
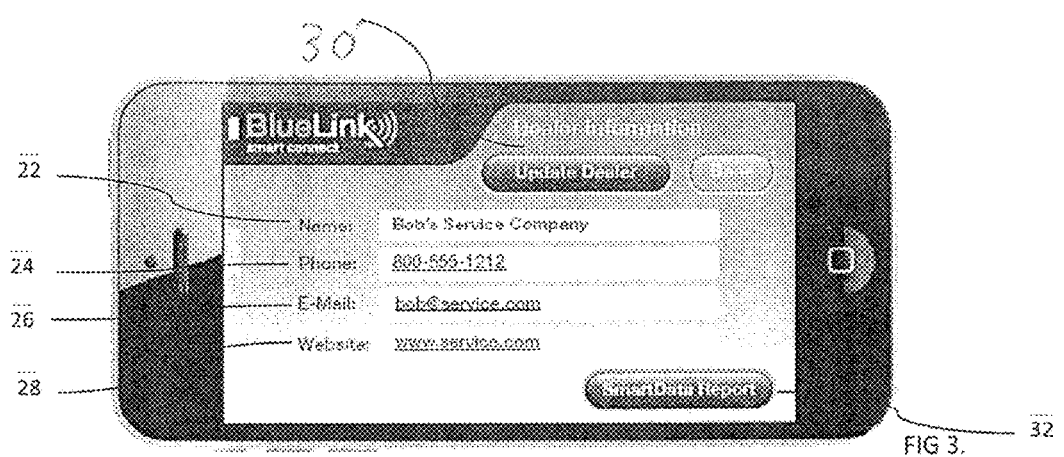
FIGS. 3-7 are illustrations of screen shots of the set-up steps for the present invention.

In an embodiment, the method starts at step 100 (FIG. 1) with the first iteration and initial set-up of the system. The application is loaded on a remote device at step 101, for example a tablet or smartphone 10 (FIG. 2). At step 102 authentication credentials are provided by inputting them to the remote device 10. For example, the remote device may have a screen such as a touchpad screen 15, 213 (FIG. 2) for entering the data. For example, in FIG. 3 at step 103 (FIG. 1), a party wishes to receive a Performance Data report. The equipment for the report is maintained by Bob's Service Company and the set-up data for the service company is has been entered into screen 15 of the smartphone 10 at fields for Name 22, Phone 24, E-mail 26 and Website 28. To modify the dealer's information, the Update Dealer button 30 is touched. At step 104, the report is created by clicking on the button "Smart Data report" button 32 in FIG. 3.

Figure 4:
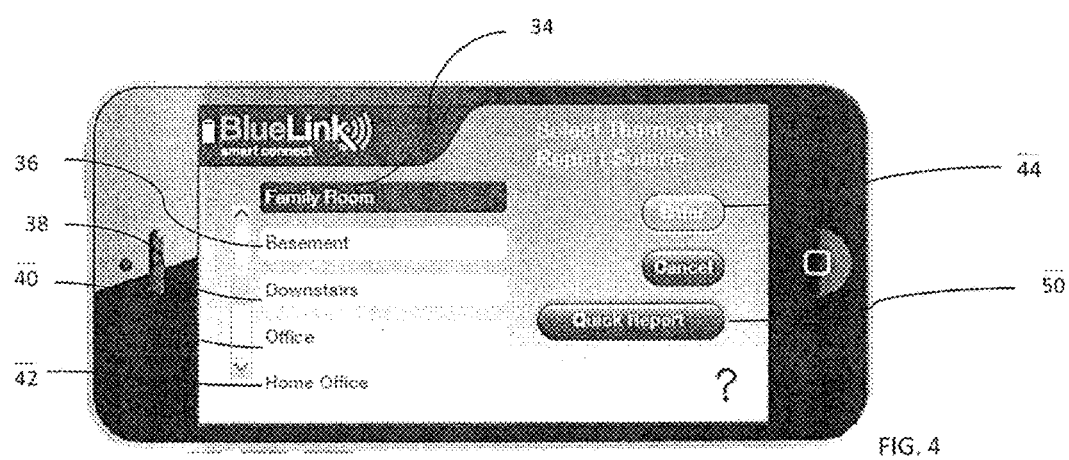
Figure 5:
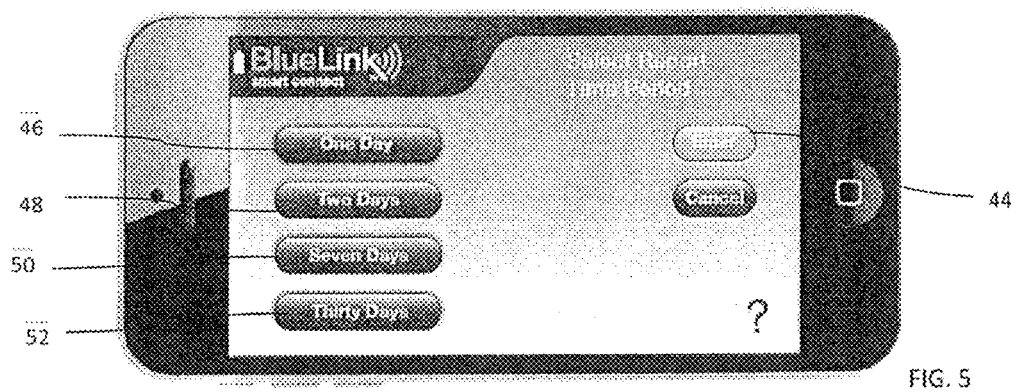
Figure 6:
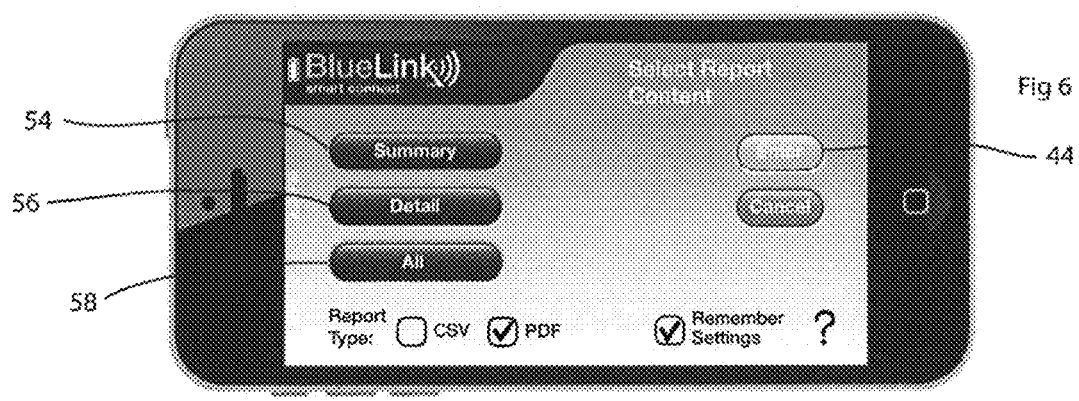

At step 105, the device (e.g. thermostat, indoor temperature sensor, outdoor temperature sensor, occupancy sensor, etc.) from which a Performance Data report is desired is selected by scrolling up or down on a list presented on the screen 15 of the smartphone 10 (FIG. 4). In an embodiment, the options of family room 34, basement 36, downstairs 38, office 40, and home office 42 are provided; from which the thermostat in any of those rooms may be selected. In an alternate embodiment, other rooms may be listed including: master bedroom, kids' bedroom, pool, shipping dock, storage room, factory processing area, etc. Once the desired location of the thermostat is selected at step 105, the preferential device is saved to the report by touching the "enter" button 44. At step 106, the predetermined time period may be selected by touching the report options screen 15 of the smartphone (FIG. 2). Among the options are one or two days for reporting. In other embodiments, a button 46 may be provided for providing a one day reporting period (24 Hours button) 46; a two day button 48 (or alternatively a 72 hour button), a Seven Days button 50 and Thirty Days button 52 (FIG. 5). In a further alternative, as shown in FIG. 1, step 106, a period of 1, 2, 7 or 30, rolling days, may be provided for the Performance Data report. At step 106 the preferred time period is saved by touching the "enter" button 44 (FIG. 5) on the screen 15.

Figure 10:
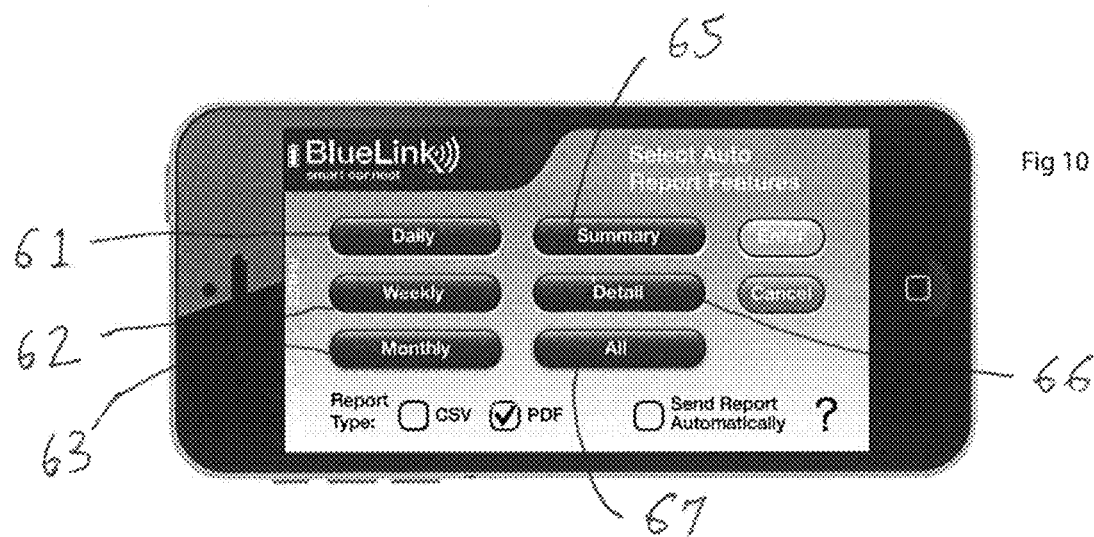
FIG. 10 is an illustration of a screen shot of a set-up step for the present invention.

At step 107 the selection of reporting just a summary 54, included details 56, or all 58 (FIG. 6) may be selected by pressing the appropriate button on the screen 15, and those selections may be saved to step 112 (FIG. 1). In an alternate step, as shown in FIG. 10, Auto Report Features may be selected including time durations of Daily, Weekly or Monthly by pressing buttons 61, 62, 63, respectively. The user may then select Summary, Detail or All by selecting buttons 65, 66, 67, respectively in FIG. 6. At FIG. 7 a confirmation of the sending of the performance data and environmental data report may be sent, such a message that states, "Auto report setting saved. Your report will be sent on July 1." (such date calculated based on when the report would be sent).

Figure 7:
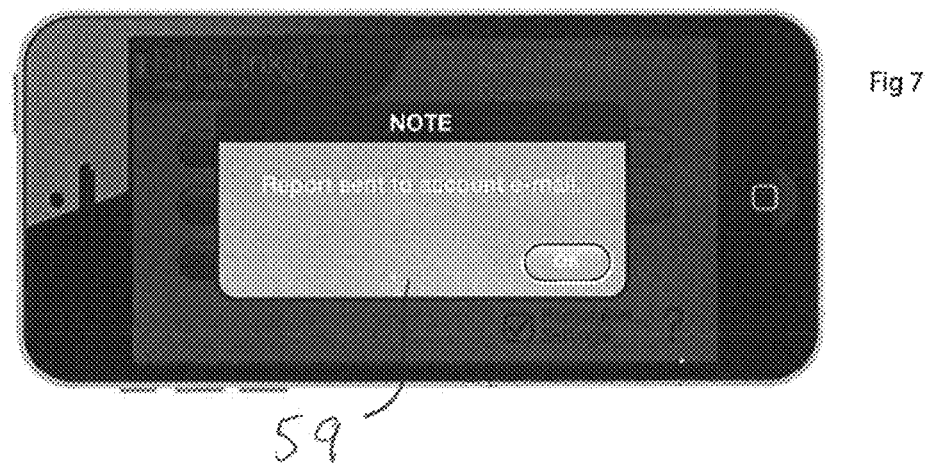

At step 108, the report may be sent by clicking on the appropriate "send" button. After that step, the screen 59 will provide a pop-up window that states "Report sent to account e-mail." (FIG. 7.)

At step 109, a Performance Data report may be generated that is stored as snapshot and transitional data and customer report preferences. The user may use the smartphone 10 to access his or her e-mail account where the Performance Data report from the thermostat has been sent and the user may save or access the report accordingly. For example, at step 113 the report may be formatted and e-mailed. At step 114 the data report that was sent from the thermostat or other controller connected to the HVAC may be confirmed as successfully sent. As well, the report may be printed if the device receiving the report is connected to a printer according to a well-known protocol at step 115.

In subsequent iterations, where a report is required but the user preferences and settings were previously input, or the default settings are sufficient, the process starts at step 120 (FIG. 1). At step 121 the user is reminded to "Navigate to Create Report Entity Screen." On the mobile device 10 a button is displayed on the screen 15 and identifies the data report system. For example, on many smart phones; a list of applications are provided or icons for the applications are displayed on the screen 15. The appropriate icon is activated/clicked at step 122 and a window will appear that provides for a "Quick Report" button 60 (FIG. 5). The "Quick Report" button 60 is clicked to send the report at step 123. The previous settings that have been entered during the first iteration, for example at steps 105-107, will remain in place for later iterations and no further input of that information is required. However, if the user desires to change those settings an option is provided. In situations where the settings do not need to be changed, the report is e-mailed at step 122. At step 125 the Performance Data report is sent to the desired e-mail service provider and the user may display the report or print the Performance Data report completing the process at step 126. Sample Performance Data reports are depicted at FIG. 8 and FIG. 9.

Turning to FIG. 2 the components of the system and the process of transmitting the Performance Data will be described. As discussed above, the smartphone 10 includes a screen 15 to which the appropriate information can be input as discussed above. The input may be via a qwerty key pad that is displayed on the touch screen display 15 or other means such as a mouse or attached keyboard. The smartphone 10 includes telecommunications standard transmission means such as 4G transmission or Wi-Fi transmission via the internet 201. The mobile device transmits via the internet to a Wi-Fi router 220 within a building where the targeted thermostat is located. The Wi-Fi router communicates with a transceiver 215 located within the thermostat 200. The thermostat includes on/off switches 209, its own display 212, a touchpad 213 and a microprocessor 214. The thermostat controls an HVAC system 211 or other heating or cooling system. The microprocessor 214 of the thermostat is programmed to transmit Performance Data regarding the operation of the thermostat 200 on a regular basis, such as every 15 minutes, or more frequently such as every second, or less frequently such as every hour. The transmission of the Performance Data is transmitted via transceiver 215 and Wi-Fi router 220 to the internet 201. For example, a cloud server 201 may collect and organize all of the Performance Data being transmitted from the thermostat 200. The transceiver 215 receives environmental data from sensors 231-236, located in or around a building that houses thermostat 200. Sensors may include outdoor temp sensor 231, indoor temp sensor 233, occupancy sensor 234, smoke sensor 235 and Carbon Monoxide sensor 236. Other sensors may include those for motion detection, barometric pressure, open or closed flu and damper vents and air circulation sensors. In this embodiment, the smartphone 10 and any other device that is linked to the desired e-mail service provider, obtains the Performance Data from the cloud server 201. In an alternate embodiment, the Performance Data may be stored in a memory location within the thermostat or the Wi-Fi router. A request for the data could be processed by the microprocessor 214 by sending the data directly to a requesting mobile device 10 (without use of a cloud server 201).

The Performance Data report may include data such as provided in FIG. 8, which provides a thirty day summary of the thermostat, in a particular room, for example, the Main Floor. The report includes date, time, system mode, system state, room temp, set point, fan state, outdoor temp and humidity level headings. An alternate report, as shown in FIG. 9 includes system run time in hours, heat run time in hours, cooling run time in hours, fan run time in hours, average heating temperature by degrees, average cooling temperature by degrees, average outdoor temperature by degrees, average humidity level by percent humidity, highest indoor temperature by degrees, lowest indoor temperature by degrees, highest outdoor temperature by degrees, lowest indoor temperature by degrees, highest humidity level by percent humidity and lowest percent humidity be percent humidity. In an alternate embodiment, a detailed report as shown in FIG. 9 may be provided which lists a time interval of fifteen minutes to provide the following data: date, time, system mode such as cool or heat or a fan, system state, room temperature, setpoint, fan state, outdoor temperature and humidity level.

In an alternative embodiment, the interval data may be replaced or supplemented with transition data, where the data would consist of the time when a parameter changed state. As a non-limiting example, the system heating state is recorded in 15-minute intervals and tabulated. The heating system changes state between the 15-minute intervals. The tabulated data may consist of the 15-minute interval data, supplemented with the transitional data of the change between the 15 minute interval. Therefore, it is understood that an application may be loaded onto a mobile computing device such as a smart phone, smart watch, virtual device, PDA or other hardware and software provided on the mobile computing device that allows for quick and easy set-up. The application may link to multiple thermostats in multiple buildings in different locations. So a user may quickly obtain Performance Data about the heating and cooling system in multiple buildings using a single application on a single mobile computing device. Alternate embodiments may provide the report in different formats including excel spreadsheet, charts, dashboard visualization illustrations, or portable document formats. Such alternate reports can provide the entire Performance Data information only segments of the Performance Data or a combination of Performance Data parts combined with other types of data pertaining to a building's environment.

The invention could be embodied in other forms without departing from the spirit or essential attributes thereof and accordingly reference should be had to the following claims rather than the foregoing specification as indicating the scope of the invention.

What is claimed:

1. A mobile device for monitoring building environmental data, the mobile device comprising:
   (1) a touchpad screen for accepting user input and displaying screens;
   (2) a wireless network interface for connecting said mobile device to a cloud server over the Internet, wherein said cloud server adapted to receive performance data generated by detection devices from a remote thermostat over the Internet; and
   (3) a specialized application, wherein said specialized application adapted to:
      (i) execute on said mobile device;
      (ii) display a first screen on said touchpad screen, said first screen displaying a quick report button for providing quick reports;
      (iii) responsive to clicking said quick report button, request said cloud server over the Internet to provide quick reports conforming to a set of saved settings, said set of saved settings entered via said touchpad screen, wherein said set of saved settings indicates a facility, a frequency and a quick report type; and
      (iv) receive a first quick report from said cloud server over the Internet.

2. The mobile device of claim 1 wherein:
   (1) said facility is one of a basement, downstairs, family room, home office, kitchen or bedroom, wherein a first detection device is a sensor, a thermostat or a HVAC control disposed in said facility to collect performance data, wherein said performance data is at least one of system run time in minutes, heat run time in minutes, cooling time in minutes, fan run time in minutes, average heating temperature by degrees, average cooling temperature by degree, average outdoor temperature by degrees, average humidity level by percent humidity, highest indoor temperature by degrees, indoor temperature by degrees, highest outdoor temperature by degrees, lowest indoor temperature by degrees, highest humidity level by percent humidity and highest percent humidity by percent humidity, date, time, system mode, system state, room temperature, setpoint, fan state, outdoor temperature and humidity level;
   (2) said frequency is daily, weekly or monthly; and
   (3) said quick report type is summary, all or both.

3. The mobile device of claim 2 wherein said sensor is an indoor temperature sensor, an outdoor temperature sensor, an occupancy sensor, a humidity level sensor, a smoke sensor, or a carbon monoxide sensor.

4. The mobile device of claim 1 wherein said specialized application is adapted, to receive said first quick report via an e-mail service.

5. The mobile device of claim 1 wherein said specialized application is further adapted to display a performance data, report notification indicating a date in the future when the next performance data report will be generated, wherein said date is computed based on said frequency.

6. The mobile device of claim 1 wherein said specialized application is further adapted to:
   (1) display a facility selection screen;
   (2) responsive to a first user input to select said facility, select said, facility;
   (3) responsive to a second user input to select said frequency, select said frequency;
   (4) responsive to a third user input to select said quick report type, select said quick report type; and
   (4) over the Internet, request said cloud server to generate performance reports based on said facility, said frequency and said quick report type, wherein said cloud server saves said facility, said frequency and said quick report type.

\* \* \* \* \*